US009834388B1

(12) United States Patent
Plett

(10) Patent No.: US 9,834,388 B1
(45) Date of Patent: Dec. 5, 2017

(54) SYSTEM FOR LOADING ELONGATED MEMBERS SUCH AS TUBES ONTO A CONVEYOR FOR LATER PROCESSING

(71) Applicant: Vidir Machine Inc., Arborg (CA)

(72) Inventor: Delmer Plett, Arborg (CA)

(73) Assignee: VIDIR Machine Inc., Arbong Manitoba (CA)

( * ) Notice: Subject to any disclaimer, the term of this patent is extended or adjusted under 35 U.S.C. 154(b) by 0 days.

(21) Appl. No.: 15/164,119

(22) Filed: May 25, 2016

(51) Int. Cl.

| | |
|---|---|
| ***E21B 19/15*** | (2006.01) |
| ***B65G 47/90*** | (2006.01) |
| ***B65G 59/02*** | (2006.01) |
| ***B65G 25/08*** | (2006.01) |
| ***B65G 17/12*** | (2006.01) |

(52) U.S. Cl.
CPC ........... *B65G 47/904* (2013.01); *B65G 17/12* (2013.01); *B65G 25/08* (2013.01); *B65G 59/026* (2013.01); *B65G 2201/0276* (2013.01)

(58) Field of Classification Search
CPC ........ E21B 19/15; E21B 19/155; E21B 19/14; B23K 2201/06; B23K 26/38; B23K 37/0229; B23K 37/047; B23Q 7/06; B65G 1/0442; B65G 25/08; B65G 59/02
USPC ..... 198/531, 535, 836.1; 221/174, 209, 232, 221/253, 270; 29/781; 414/22.52, 22.57, 414/22.59, 22.62, 745.1–745.9, 414/746.1–746.8, 796.2, 796.5, 796.6, 414/796.7, 796.8, 797.3, 933
See application file for complete search history.

(56) References Cited

U.S. PATENT DOCUMENTS 3,231,102 A * 1/1966 Boyle .................... B65G 59/02 221/11
3,858,731 A * 1/1975 Briggs ................... A01G 25/09 198/394
4,389,148 A * 6/1983 Lorenz ................. B65G 57/035 198/740
4,439,091 A * 3/1984 Frias .................... B65G 1/0442 175/85
5,096,367 A * 3/1992 Winski ................. B65G 59/005 414/795.3
5,450,943 A * 9/1995 Yew ....................... B65G 25/08 198/468.6

(Continued)

FOREIGN PATENT DOCUMENTS

CA 2419885 A1 * 8/2003 ........... E21B 19/155

*Primary Examiner* — Gregory Adams
(74) *Attorney, Agent, or Firm* — Adrian D. Battison; Ade & Company Inc.

(57) ABSTRACT

A system for loading elongated members, such as metal tubes and bars, onto a conveyor for later processing features an elevator, pusher arms, a support surface provided at a predetermined height, and gripper arms. The elevator acts to lift a topmost layer of the members, which are typically arranged in a stack thereon, to a predetermined height so that the pusher arms may transfer the members forming the topmost layer onto the support surface at this height. The pusher arms push these members across the support surface by engaging the member farthest from the support surface until the respective elongated member passes over a distal side of the support surface and onto the gripper arms arranged at a height of this side. The gripper arms lower that member to an unloading location below the support surface where an empty support cradle of the conveyor is arranged for receiving same.

20 Claims, 7 Drawing Sheets

(56) References Cited

U.S. PATENT DOCUMENTS

2003/0196791 A1* 10/2003 Dunn .................... E21B 19/155
166/77.51
2009/0263221 A1* 10/2009 Oldershaw ............. E21B 19/15
414/495
2010/0150685 A1* 6/2010 Sawyer ................... E21B 19/15
414/22.62
2012/0219396 A1* 8/2012 Schopf ................... B23K 26/38
414/745.1

* cited by examiner

CONTROL
C
10
15
18
20
16
17
12
22
19
1B
235A
U
216
177A
500
I
201
17
11A
1A
231A
142B
2
213
211
605
603
214
140
501
174A
175
174
172
116
133
227
111
113
320
185
170

216
227
177A
208
221A
221B
219
225
223
182
203
201
209
200
205
203
185

1
124
131
122
120
119A
119
179
PD
302
174
116
126A
113
126B
227

185
114C
341
320
172
182
322A
124
114A
405
608
122
407
404
114B
401B
606A
306
322B
115
131
605
606C
609
133
343
147
114E
179
322
200C
401
120
119A
8
177
118
129
320
606B
118
133
128
400
114D
401A
124
213
400

185
133
118
174
306
115
114E
131
322
114A
122
201
341
182
120
179
310
PD
174
133
118
302
126B
113
116
126A
300
124

SYSTEM FOR LOADING ELONGATED MEMBERS SUCH AS TUBES ONTO A CONVEYOR FOR LATER PROCESSING

FIELD OF THE INVENTION

The present invention relates to a system for loading elongated members, for example tubes or bars, onto a conveyor for later processing. The system described in detail in this application is designed particularly but not exclusively for use at an initial stage of an overall material processing system including a laser cutting machine which performs cutting operations on elongated metal members one member at a time.

BACKGROUND

In the example of laser cutting machines such as those manufactured by Mazak Corporation, many such cutting machines (also termed 'cutters') operate on the members, which are to be cut, one member at a time. The laser cutting machine is itself relatively automated; however, typically a system for feeding members to the cutter machine is substantially manual. That is, the feeding system typically involves loading by hand or by overhead crane each member into a respective movable support carried by a conveyor from which, at a location downstream of the loading location where the member was placed onto the conveyor, the respective member is removed and processed by the cutter. Additionally, using the overhead crane still requires human intervention to arrange supports of the crane for holding the member around same. Therefore, conventional manual loading presents a considerable safety risk to human operators/workers.

SUMMARY OF THE INVENTION

According to one aspect of the invention there is provided a system for loading members which are elongated in a longitudinal direction onto a conveyor which feeds the elongated members to another machine for processing said elongated members, the system comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

a second support surface provided at the predetermined height with a first side adjacent the elevator and an opposite second side spaced transversely outwardly thereof;

the second side of the second support surface that is distal to the elevator being raised relative to the first side so that the second support surface is inclined upwardly and outwardly in a transverse direction transversely of the elevator;

one or more pusher arms at spaced locations longitudinally of the elevator that are arranged at the predetermined height and carried for movement transversely of the elevator for moving the elongated members in the transverse direction from the elevator onto the second support surface;

one or more gripper arms at longitudinally spaced locations at or adjacent the second side of the second support surface in opposite relation to the elevator;

said one or more gripper arms being movable in upward and downward directions from the second support surface to an unloading location below said second side of the second support surface where the elongated members are arranged for unloading from the gripper arms and loading onto the conveyor;

said one or more pusher arms being movable across the second support surface in the transverse direction for additionally moving the elongated members from the second support surface over the second side thereof to the gripper arms adjacent thereto.

The system can handle elongated members having cross-sections of different shapes for example circular; rectangular; square; C-shaped as with for example channel iron; L-shaped as with for example angle iron; and I-shaped as with for example I-beam.

The system also can handle various forms of elongated members for example tubes/tubing with a hollow inside and bars having a solid cross-section throughout.

All of the components of the system for loading onto the conveyor may be supported on a generally unitary structure such that the system forms a single machine.

Alternatively, at least one of the components may be separate from a machine which is defined by two or more of the remaining components of the system. For example, the elevator may be formed by a shuttle carrying a stack of elongated members which is movable from a shipping/receiving area where the stack of elongated members is placed on the shuttle and into a cooperative working position in which the elevator is appropriately located relative to the second support surface for cooperating with the remaining components of the system.

An important independent optional feature is that there is provided an upstanding surface at one end of the second support surface at the unloading location and the gripper arms are also movable toward the upstanding surface so as to bring an end of the respective elongated member carried thereby into butting engagement with the upstanding surface so as to load each elongated member onto the conveyor at a common reference point longitudinally of the conveyor.

The upstanding surface may extend upwardly beyond the unloading location towards the second support surface so that the elongated member may be brought into butting engagement with the upstanding surface above the unloading location.

The upstanding surface may also extend transversely of the elevator in a direction away from the second support surface such that the upstanding surface extends along the conveyor so that the elongated members may be maintained at the common reference point until processed by a system or machine downstream of the unloading location.

There may also be provided another upstanding surface which is at one end of the elevator proximally to the upstanding surface at the unloading location. This other upstanding surface is preferably one of (i) aligned with the upstanding surface at the unloading location, longitudinally of the elevator, and (ii) spaced from said upstanding surface in a direction towards an opposite end of the elevator. This other upstanding surface acts to engage ends of the elongated members as they rest on the elevator prior to moving therefrom onto the second support surface. As such, this other upstanding surface provides an initial reference point to ensure that these ends of the elongated members are not located longitudinally beyond the upstanding surface at the unloading location before being moved across the second support surface.

There may additionally be provided yet another upstanding surface which is at one end of the second support surface proximally to the upstanding surface at the unloading location. This further upstanding surface may be arranged with similar considerations taken with respect to the upstanding surface at the unloading location as described in the previous paragraph. This further upstanding surface acts to engage ends of the elongated members as they move across the second support surface so that these ends are not located longitudinally beyond the upstanding surface at the unloading location before the respective elongated member is received by the gripper arms for movement to the unloading location.

In one arrangement each gripper arm is guided in upward and downward movement by a support member extending downwardly from a gripper hand for holding the respective elongated member with a central pivot point and a pin therebelow extending transversely of the support member that is mated in a substantially vertically extending track which follows an uninterrupted path having components in two dimensions in an upstanding plane oriented longitudinally of the elevator.

In this arrangement the central pivot point is in fixed relation longitudinally of the elevator so as to move vertically upwardly and downwardly as the pin traverses the uninterrupted path of the track such that a horizontal displacement of the pin with respect to the central pivot point causes the respective gripper arm to pivot thereabout thereby locating the hand in a position by which the pivot point is horizontally intermediate the gripper hand and the pin.

Typically, the central pivot point is not mated with the track.

Another important independent optional feature is that each gripper arm forms a support surface inclined upwardly and outwardly in a transverse direction with a stop at a lower end of the support surface that is raised upwardly from said support surface for resisting the respective elongated member carried by the gripper arms from rolling off the lower ends of the gripper arms.

Typically said support surface extends outwardly in the same transverse direction as the second support surface.

In one arrangement the elevator comprises a platform defining the first support surface that is movable in the upward direction, inclined transmission members at longitudinally spaced positions of the platform that extend downwardly therefrom and horizontally in a predetermined direction, and a pushing assembly disposed under the first support surface that is arranged for movement in a horizontal plane in the predetermined direction for pushing against the transmission members so as to effect movement of the platform upwardly.

This arrangement may, in a more consistent manner, provide uniform lifting for the elongated members in an orientation which matches the first side of the second support surface so that the respective member may be properly moved from the elevator onto the second support surface.

Typically there is provided a plurality of the pusher arms for pushing the elongated members which may thus each have a contact area spanning a fraction of the length of the respective elongated member. This is more practical for a system which handles elongated members having lengths for example in the range of 8 feet to 24 feet.

In one arrangement there are a pair of the pusher arms and wherein longitudinal spacing between each one of the pair of pusher arms is adjustable such that elongated members of different lengths are movable thereby.

For example, each pusher arm includes a pushing surface carried along an elongate track which is pivotally supported by an upstanding post alongside the elevator distally to the second support surface. An adjacent pair of the upstanding posts may be interconnected by a horizontal cross-member which has a first telescoping portion coupled to one of the posts that is slidably receivable in a second telescoping portion coupled to a second one of the posts.

In one arrangement the pusher arms each include the pushing surface carried along the elongate track which is pivotally supported alongside the elevator distally to the second support surface such that the respective track is arranged for swivelling movement about an upstanding axis so as to be movable from a working position in which the track is oriented transversely of the elevator to a member loading position in which the track is oriented longitudinally of the elevator alongside thereto.

Typically there is provided a plurality of the gripper arms for moving the elongated members from the second support surface to the unloading location for unloading onto the conveyor, which is more practical for a system which handles elongated members having lengths for example in the range of 8 feet to 24 feet.

In one arrangement longitudinal spacing between each one of a pair of the plurality of the gripper arms is adjustable such that elongated members of different lengths are movable thereby.

In one arrangement one of the plurality of the gripper arms is fixedly located between said pair of the gripper arms and wherein a drive assembly arranged for driving the gripper arms in upward and downward movement includes a longitudinally extending shaft formed in at least two sections where one of the sections forms a receptacle for slidably receiving another one of the sections so as to adjust the longitudinal spacing of the pair of the gripper arms relative to the gripper arm that is fixedly located.

In one instance the one of the sections forming the receptacle is polygonal-shaped in transverse cross-section with at least four sides.

In this instance the other one of the sections received therein may be for example circular in transverse cross-section.

In one arrangement, the conveyor, in combination with the system, comprises a plurality of movable supports each arranged to carry one of the elongated members therein.

Thus, the gripper arms are arranged to carry one elongated member at a time from the second support surface to the unloading location for unloading therefrom onto the conveyor.

In one arrangement each one of the movable supports of the conveyor for carrying the elongated members is generally V-shaped and oriented transversely of the second support surface, and the unloading location of the gripper arms is arranged to locate the respective elongated member upon initial contact with the respective V-shaped support transversely outwardly of its apex.

Typically the initial contact is made with the V-shaped support transversely outwardly of its apex in a direction (transversely) away from the second support surface.

In one arrangement, the processing machine, in combination with the system, is a laser cutting machine.

According to another aspect of the invention there is provided a method for loading elongated members which are elongated in a longitudinal direction onto a conveyor which feeds the elongated members to another machine for processing said elongated members, the method comprising:

providing a system for loading the elongated members onto the conveyor comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

a second support surface provided at the predetermined height with a first side adjacent the elevator and an opposite second side spaced transversely outwardly thereof;

one or more gripper arms at longitudinally spaced locations at or adjacent the second side of the second support surface in opposite relation to the elevator;

said one or more gripper arms being movable in upward and downward directions from the second support surface to an unloading location below said second side of the second support surface where the elongated members are arranged for unloading from the gripper arms and loading onto the conveyor;

one or more pusher arms at spaced locations longitudinally of the elevator that are arranged at the predetermined height and carried for movement transversely of the elevator for moving the elongated members in the transverse direction from the elevator and across the second support surface so as to move the elongated members from the elevator across the second support surface over the second side thereof to the gripper arms adjacent thereto;

providing the set of the elongated members arranged in one or more layers in a stack on the first support surface on the elevator;

arranging a topmost layer of the stack at the predetermined height by raising the first support surface of the elevator;

moving the topmost layer of the stack of the elongated members out of the stack across the second support surface towards the gripper arms arranged at a height of the second side of the second support surface;

wherein the step of moving the topmost layer comprises pushing each one of the elongated members forming the topmost layer by engaging with said one or more pusher arms a first one of the elongated members forming the topmost layer which is farthest from the first side of the second support surface so as to effect butting engagement of each elongated member and the next in a manner conducing movement of the elongated members across the second support surface in a direction from the first side to the second side;

and with the respective elongated member received on the gripper arms, lowering the respective elongated member to the unloading location.

Therefore, a grouping of the elongated members may be provided and the system operates to load each member from the grouping individually onto the conveyor.

In one arrangement there is provided an upstanding surface at one end of the second support surface at the unloading location, and at a point during the step of lowering the respective elongated member to the unloading location an end of said elongated member is brought into butting engagement with the upstanding surface so as to load each elongated member onto the conveyor at a common reference point longitudinally of the conveyor.

In one arrangement there is provided the conveyor comprising a plurality of movable supports which are generally V-shaped and oriented transversely of the second support surface, and the respective elongated member arranged at the unloading location is located upon initial contact with the respective V-shaped support transversely outwardly of its apex causing the respective elongated member to rotate about its longitudinal axis as the gripper arms are moved downwardly until the elongated member is seated in the apex of the V-shaped support.

In one arrangement the second support surface is inclined so that the second side thereof is raised relative to the first side such that the elongated members of the topmost layer are pushed across an incline towards the gripper arms arranged at the height of the second side of the second support surface.

BRIEF DESCRIPTION OF THE DRAWINGS

One arrangement of the invention will now be described in conjunction with the accompanying drawings in which.

In the drawings like characters of reference indicate corresponding parts in the different figures.

DETAILED DESCRIPTION

Figure 1:
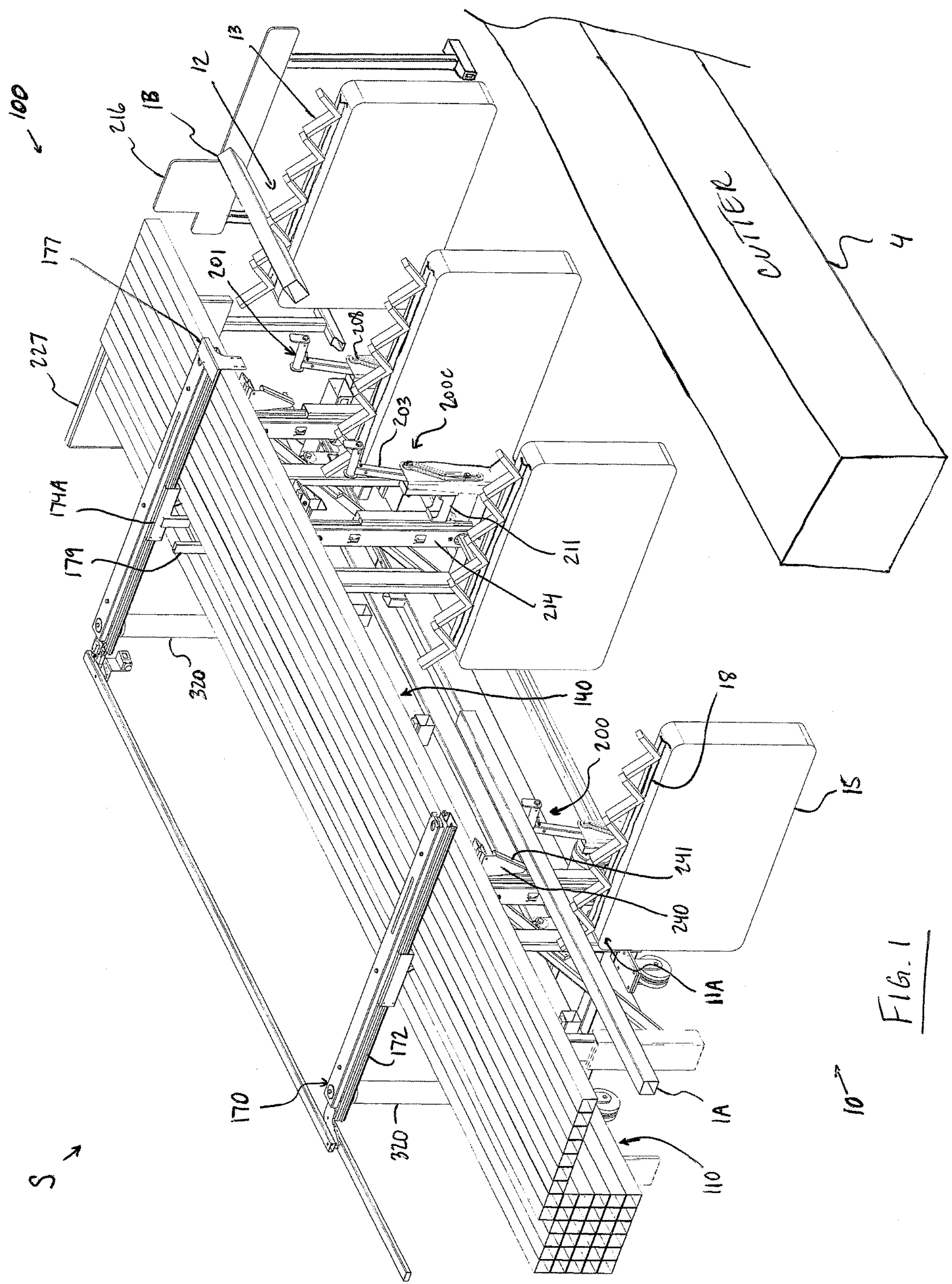
FIG. 1 is a perspective view of system for loading members which are elongated in a longitudinal direction onto a conveyor, according to the present invention. That member which is resting in a support of the conveyor and another member which is on gripper arms of the system are shown with a portion of their length cutaway for clarity of illustration.

There is illustrated in the accompanying figures a loading system, which is generally indicated at 100, for loading elongated members 1 onto a conveyor 10 by which the members 1 are then carried to a location downstream of the loading system 100 for processing thereat. (Hereinafter, the loading system may also be referred to as 'loader' for short.)

In the illustrated arrangement the elongated members 1 comprise tubes (having hollow interiors) which are square in cross section, like the tube indicated at 1A. The tubes which can be handled by the loading system 100 are not limited to a square cross-section however and may also, for example, be circular in cross-section or rectangular in cross-section, like the tube indicated at 1B. Furthermore, alternatively to tubes the elongated members may comprise bars (which are solid) which also may have cross-sections of different shapes such as C-shaped as with for example channel iron, L-shaped as with for example angle iron, and I-shaped as with for example I-beam.

The subsequent processing performed on the elongated members 1 downstream of the loading system 100, in the illustrated arrangement, comprises cutting of the members 1 by a laser cutting machine 4 (schematically shown) like that manufactured by Mazak Corporation. An example of cutter manufactured by Mazak Corporation that may be arranged in an overall material processing system as shown in the figures at S is Mazak 3D FABRI Gear 220 MKII.

The laser cutter 4 includes arms supporting a chuck (not shown) which sequentially remove one member 1 from the conveyor at a time and pass same through a cutting portion of the machine 4 where a head carrying a cutting laser (not shown) performs a cutting operation on the elongated member according to a predetermined plan/design programmed into the cutter. Thus, the loading system 100, conveyor 10, and cutting machine 4 together form the overall material processing system S for processing the elongated members 1, in which the loader 100 is located at an initial stage so as to be upstream of the conveyor 10 and the cutter 4.

The loader 100 is thus operable to process the elongated members which form raw material for use by the processing system S. The raw material is typically provided in the form of one or more bulk bundles which are more convenient for shipping. However, only one member 1 may be processed by the cutter at any time, such that there is need to separate from the respective bunk bundle the individual members 1 forming same such that the raw material is readied for processing by the cutter 1.

We now turn to the structure of the loading system 100.

The loader 100 comprises an elevator generally indicated at 110; an elevated table adjacent thereto that is generally indicated at 140 (and hereinafter also may be referred to as 'transition table'); pusher arms generally indicated at 170 which are arranged over the elevator and elevated table; and gripper arms generally indicated at 200 that are adjacent the table 140 on the other side thereof relative to the elevator 110.

Generally speaking, the elongated members 1 are placed onto a support surface 111 of the elevator which then carries the members 1 in an upward direction to a predetermined height at which the elevated table 140 is arranged. The pusher arms 170, which are also arranged at the predetermined height, are carried for movement transversely of the elevator 110 so as to move the elongated members in a transverse direction from the elevator onto a support surface 111 of the table 140. With the respective elongated member 1 moved from the elevator onto the table 140, the pusher arms 160 continue to move the respective member thereacross from one side 142A of the table 140 adjacent the elevator to another side 142B located transversely distally thereto, and over the second side 142B onto the gripper arms 200 which are arranged at a height of the second side 142B. The gripper arms 200 lower the member 1 to an unloading location generally indicated at U at which the member is placed onto the conveyor 10.

The elevator 110 includes a platform 113 defining at its top face the elevator support surface 111. The platform 113 is formed by a number of interconnected beam members 114, some of which are oriented longitudinally of the elevator and some which are oriented transversely thereof. A collection 114A-114D of the members forms a periphery of the platform, which is rectangular in shape. Another collection of members 114E are arranged at longitudinally spaced locations and span transversely between the members 114A and 114B which are oriented longitudinally of the elevator.

It is the transversely oriented members 114E and those at 114C and 114D forming ends of the platform at its periphery which substantially define the elevator support surface 111. The longitudinal members 114A, 114B may be considered to define the elevator support surface together with the transverse members 114C-114E though the latter are those which individually may receive thereon several elongated members arranged side by side in for example a horizontal layer.

It will be appreciated that the platform is elongated in a longitudinal direction in which the elongated members 1 extend so that the members may be oriented on the elevator longitudinally thereof. The platform 113 is sized in length to span at least a half of the length of the elongated members, which are typically sized in length in an example range between 8 feet to 24 feet. As such, the platform may have a length of about 12 feet so that the elevator may carry elongated members with a length in the range of 8-24 feet. In terms of width, the platform is sized to support a plurality of elongated members arranged each alongside the next in side-by-side configuration across the elevator support surface 111. Thus, for example the elevator may have a width of about 3-4 feet.

In order to reduce friction between the elevator support surface 111 and the elongated members 1, which in the illustrated arrangement are metal just like a majority of the parts of the system 100, there is provided a plurality of transversely elongate plastic bearing strips 115 at a number (if not all) of the transversely extending members 114.

Figure 4:
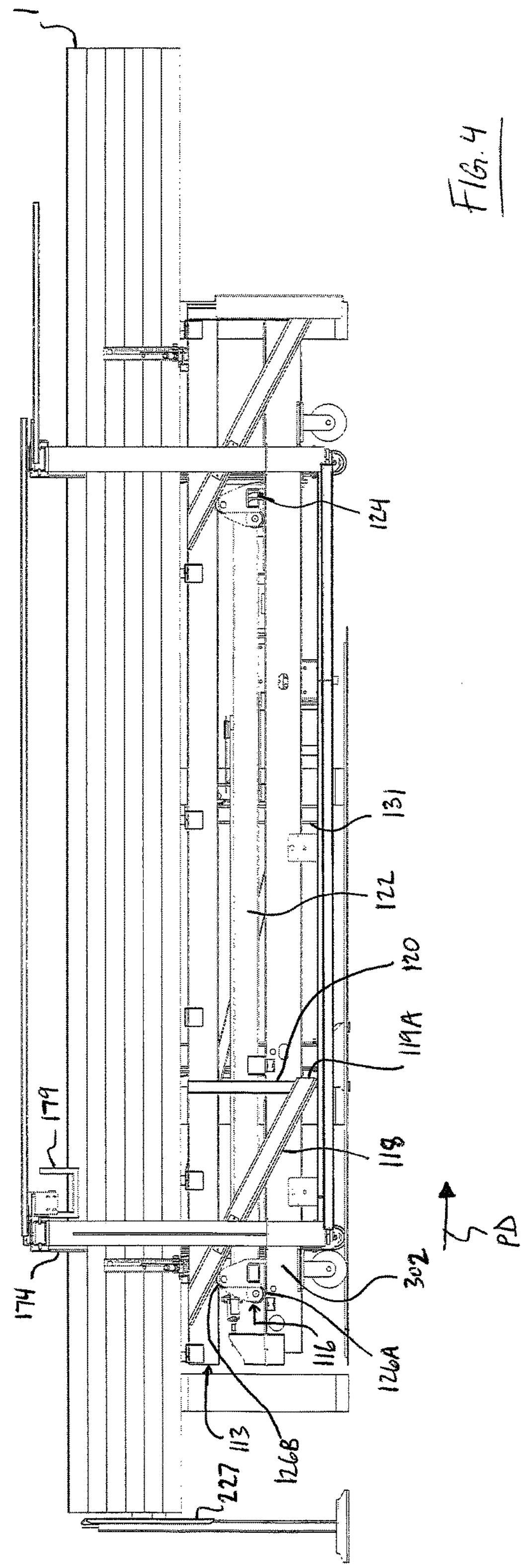
FIG. 4 is an elevational view from another side of the system and conveyor of FIG. 1.
Figure 5:
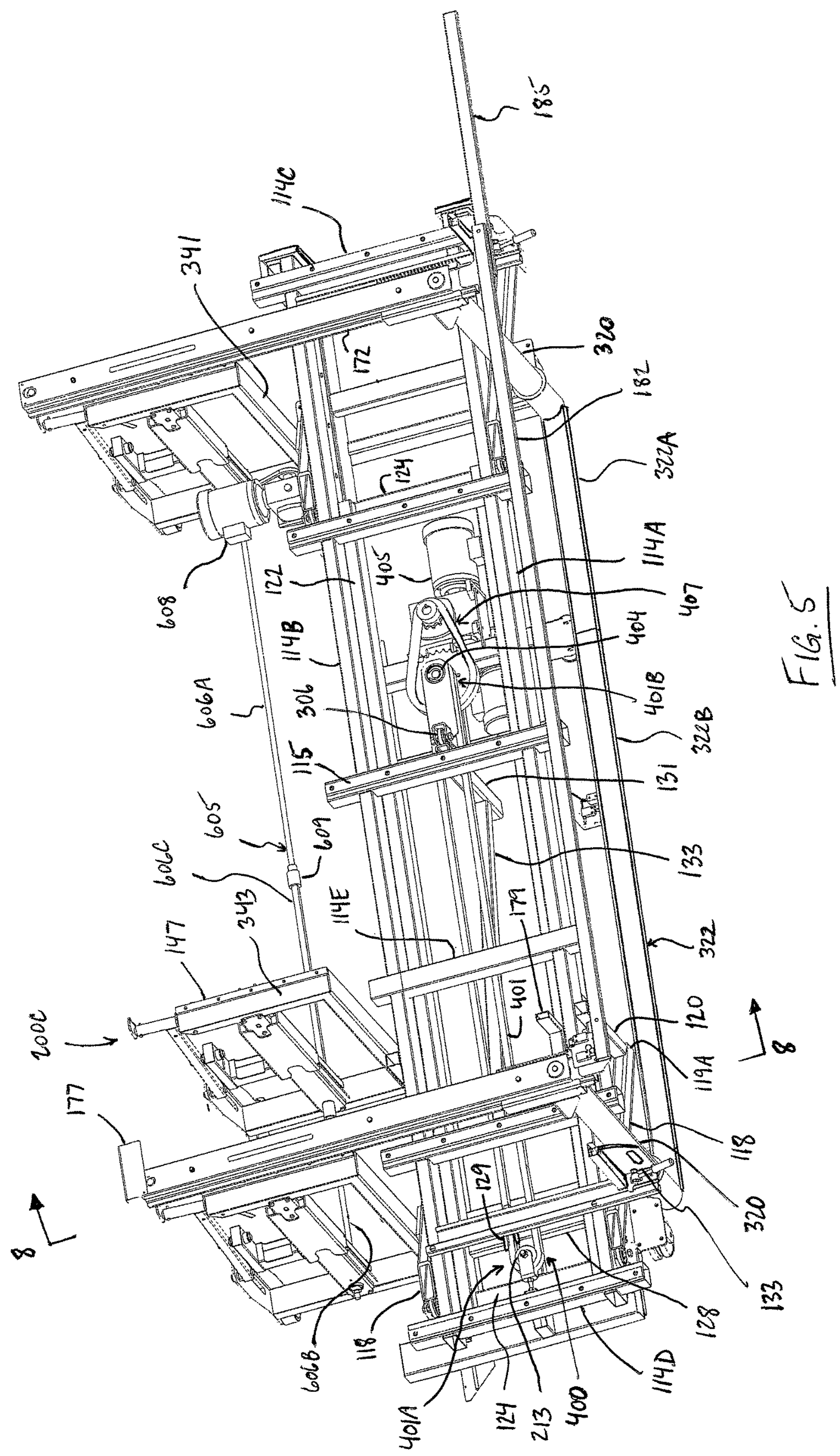
FIG. 5 is a perspective view from the top and one side of the system of FIG. 1 without the conveyor.

As mentioned before, the elevator is arranged for lifting the elongated members carried thereon to the predetermined height at which the table 140 is provided. The platform 113 is thus movable in the upward direction for lifting the member(s) carried thereon by cooperation of a pushing assembly 116 disposed beneath the platform, which is arranged for pushing movement in a horizontal plane in a predetermined direction PD shown by a correspondingly labelled arrow in FIG. 4, and two sets of inclined transmission members 118 at longitudinally spaced positions along the elevator. Each set of inclined transmission members comprises a pair of the members 118 which extend both downwardly from the platform 113 and horizontally in the predetermined direction PD. All of the inclined transmission members form a uniform angle with the platform. The transmission members 118 are coupled to outward faces of the longitudinal members 114A, 114B. Furthermore, the transmission members 118 are braced at their lower ends 119A by a vertically extending member 120 which bridges the lower end 119A and the platform thereabove.

The pushing assembly 116 is planar, and comprises a pair of longitudinally extending beam members 122 forming sides of the pushing assembly that are spaced by a distance smaller than that between the longitudinal platform members 114A, 114B so that a width of the pushing assembly at the members 122 is less than the distance between the members 114A and 114B. In addition to the longitudinal members 122, there are provided a pair of transversely extending members 124 each arranged at one end of the pair of longitudinal members 122 so as to define ends of the pushing assembly. These transverse beam members 124 extend transversely outwardly beyond outward surfaces of the longitudinal members 122 so that the width of the pushing assembly at the transverse members 124 is greater than that at the longitudinal members 122.

Where the transverse pushing members 124 extend transversely beyond the longitudinal pushing assembly members 122 a pair of wheels or rollers 126A and 126B are attached thereat in a manner so as to be arranged for rolling movement with an axis of rotation oriented transversely perpendicular of the elevator.

Thus, a rigid frame of the pushing assembly 116 collectively defined by the longitudinal members 122 and transverse members 124 is movable in the predetermined direction PD by rolling movement provided by the rollers 126A engaging longitudinally extending rails 302 of a underframe 300 thereunder.

The rollers 126B are supported for rotational motion at a top face of the respective transverse member 124 by upstanding flanges connected to the member 124 so as to be arranged at a position where the roller 126B can rollably engage the inclined member 118 of the platform.

As such, the transverse members 124 which locate the rollers 126B engaging the inclined members 118, as well as the rollers 126A engaging the rails 302 of the underframe, are spaced from one another by a distance equivalent to spacing between the two sets of inclined transmission members 118. Thus, as the pushing assembly 116 is displaced horizontally, the platform is displaced vertically in level orientation as each roller 126B engages the corresponding transmission member 118 at a common horizontal location thereon.

The pushing assembly 116 is driven for movement in its horizontal plane by a chain drive 400 comprising an endless chain 401 forming a loop residing generally in the horizontal plane of the pushing assembly. The loop formed by the endless chain is elongate in the longitudinal direction and is supported in rotation at one end 401A by a sprocket 213 attached in fixed relation at the underframe and at an opposite end 401B centrally of the underframe 300 and platform 113 at a sprocket 404 coupled to a drive motor 405 via a drive coupling arrangement 407 formed by another pair of sprockets drivably interconnected by a chain. The drive motor 405 is supported by the underframe 300 in fixed relation thereto.

The pushing assembly 116 thus includes another transversely extending member 128 at a location along the pushing assembly 116 which is intermediate the sprockets 401, 404. This transversely extending member is located closer to one of the members 124 than the other one thereof and thus there is provided a bracing member 130 bridging between the closer one of the members 124 and the member 128. The member 128 supports a carrier 129 attached for example by a conventional arrangement to the endless chain 401 so as to be carried by the chain in movement longitudinally of the elevator. For example, the carrier may form a housing with teeth matingly engaged with links of the endless chain so as to be in fixed relation therewith.

It will be appreciated that in this arrangement the drive motor 405 is arranged for movement in forward and reverse directions so that the pushing assembly is movable correspondingly in both the predetermined direction PD and that opposite thereto for both raising and lowering the platform 113.

In order to help guide the platform in its upward and downward movement, there is provided a downwardly depending post 131 generally centrally of the platform that is connected at its upper end to one of the transverse members 114E of the platform. Accordingly, the underframe 300 supports a roller 306 disposed in the predetermined direction PD of the post 131 so that when the pushing assembly 116 moves in the predetermined direction so as to urge the platform 113 upwardly, the roller 306 acts as a stop resisting the platform from shifting in the predetermined direction PD and instead helps to transmit the horizontal movement in the predetermined direction of the pushing assembly 116 to vertical movement of the platform in the upward direction.

A lower end of the post 131 is braced by an inclined member 133 extending from one of the transverse platform members 114E downwardly and horizontally in the predetermined direction towards the post.

As mentioned previously, the underframe 300 is disposed beneath the pushing assembly 116 which is beneath the platform 113. The underframe comprises a number of longitudinal frame members defining the rails 302 and transversely oriented frame cross-members.

Additionally, the underframe 300 includes upstanding posts 320 which are disposed on a side of the elevator which is distal to the table 140. At a top of the upstanding posts 320 there is supported the pusher arms 170 which will be described in more detail shortly.

At an opposite side of the elevator with respect to the upstanding posts 320, the underframe 300 includes a pair of C-shaped members forming brackets 340 at spaced positions from one another longitudinally of the elevator 110. A first leg 341 of each of the C-shaped brackets extends upwardly from a base of the underframe, where the rails 302 are located, to the predetermined height, and a second leg 343 of each C-shaped bracket at a top of the first leg extends transversely outwardly away from the elevator so as to form on its top face a support surface 145 of the transition table 140. That is, the top faces of the C-shaped brackets 340 collectively define the table support surface 145.

As such, the top faces of the C-shaped brackets carry thereon plastic bearing strips 147 similar to those on the platform 113.

Furthermore, the first leg 341 of each C-shaped bracket provides a surface facing the elevator against which the elongated members carried on the elevator may be abutted so as to maintain same on the platform. In the illustrated arrangement, there is provided in opposite relation to the first legs 341 of the C-shaped brackets on the other side of the platform an adjustable side stop 133 which is movable transversely of the platform. The adjustable stop 133 defines a surface upstanding from the elevator support surface 111 that cooperatively with the elevator-side surface of the first leg 341 may act to restrict transverse movement of the elongated members resting on the platform which may be undesirably caused by for example vibration of the platform as it moves upwardly. Typically the adjustable side stop 133 is set at a position relative to the first legs 341 of the C-shaped brackets so as to substantially sandwich the elongated members resting in a space therebetween, such that undesirable transverse movement is substantially prevented altogether.

Turning now to the pusher arms 170, the pusher arms are pivotally carried at a top of the upstanding posts 320 and are arranged at longitudinally spaced positions of the elevator. Each pusher arm includes an elongate track 172 pivotally connected at the respective upstanding post 320 such that the respective pusher arm be moved in swivelling movement about an upstanding axis defined by the post 320 between a working position, in which the track is oriented transversely of the elevator, and a member loading position, in which the track is oriented longitudinally of the elevator along its side that is distal to the table 140. The pivotal connection is for example provided by a conventional pin-in-aperture arrangement with a locking mechanism for holding the track 172 in the selected one of the positions.

Further to the track 172, each pusher arm includes a pusher body 174 connected at its top to the track so as to depend downwardly therefrom, and which carries a transversely-facing pushing surface 175. The pusher body 174 which forms a transversely oriented plate is movable along the track 172 by a chain drive system 500 including a chain 501 forming an endless loop and similar in arrangement to that drive system indicated at 400. The endless chain is elongated in the same dimension in which the track is. The chain 501 rotates about a freely rotating sprocket 503 located at a free end of the respective track 172 and another drive sprocket 505 located along the upstanding axis where the track pivots at the post 320. This drive sprocket 505 is coupled to a vertically oriented shaft 508 extending through the respective upstanding post 320, with another drive sprocket 511 at its bottom end 508A coupled by a driving chain to a drive motor 514 which is thus able to drive the endless chain 501 at the track. Furthermore, a top 174A of the pusher body thus forms a carrier in mating engagement with one longitudinally extending run of the endless chain 501 so that the pusher body is movable with that run in fixed relation thereto.

The pusher bodies 174 are thus arranged at the predetermined height at which the first side 142A of the table 140 is located so that those elongated members lifted to the predetermined height by the elevator 110 may be moved therefrom onto the table support surface 145.

In the illustrated arrangement, the table support surface 145 is inclined upwardly and outwardly in a transverse direction transversely of the elevator such that the second side 142B distal to the elevator is raised relative to the first side 142A of the table. As such, elongated members with cross-sections shaped such that the elongated member may have a tendency to roll (for example, a circular cross-section) may be moved in a controlled manner across the table 140. That is, by the inclination of the table 140 gravity conduces potential rolling movement of the respective elongated member towards the lower first side 142A but the pusher body 174 acts as a stop with the pushing surface 175 facing in the transverse direction towards the second side 142B of the table. As such, by cooperation of the pusher body 174 and inclination of the table support surface 145 the elongated members may be controllably moved thereacross from the first side 142A to the second side 142B.

At the free end of one of the tracks 172, distally to the upstanding post 320, there is provided a stop guard in the form of an L-shaped flange 177 with a downwardly depending leg 177A spaced from the end of the track longitudinally thereof. This stop guard may limit movement of the pusher body along the track so as to maintain the body 174 on same.

Longitudinal spacing between the adjacent pusher arms 170 may be adjusted so that the loader 100 may handle are a variety of different lengths of elongated members. The upstanding posts 320 are interconnected by a horizontal cross-member 322 of the underframe extending longitudinally of the elevator intermediate the upstanding posts. The horizontal cross-members comprises a first telescoping portion 322A (schematically shown) at coupled to one of the posts 320 that is slidably receivable in a second telescoping portion 322B (schematically shown) coupled to a second one of the posts.

Each upstanding post 320 is connected via a transversely extending base member 308 of the underframe 300 to the respective C-shaped bracket 340 forming the table 140 at its top. Furthermore, each gripper arm 200 is supported between a bottom third leg 346 of the respective C-shaped bracket 340, which extends transversely from the first leg 341 in a direction outwardly away from the elevator 110, and the C-shaped bracket's upper second leg 343. As such, the C-shaped bracket and gripper arm are movable with the respective upstanding post, with the base member 308 supporting wheels 310 for rolling movement on a support surface (i.e., a floor) beneath the loader 100 so that the longitudinal spacing between the two pushers arms 170, two outermost ones of the gripper arms 200, and two outermost ones of the brackets 340 forming the table 140 may be adjusted.

The extent to which the longitudinal spacing between the aforementioned components can be adjusted is limited by placement of the conveyor 1. Therefore, on at least one of the pusher arms 170 there is provided an extension piece 179 in the shape of a U that projects transversely with respect to the track 172 in a direction towards an opposite one of the pusher arms. This extension piece serves to effectively widen the pushing surface 175 of the corresponding pusher arm should the elongated member(s) being processed by the loader 100 be shorter than a minimum distance between the pusher bodies 174.

Also, it will be appreciated that the tracks 172 are connected by a longitudinally extending member 182 which is pivotally connected to each track 172. One of the tracks 172 includes a lever 185 which is operable to swivel the pusher arms 170 between the working position and the member loading position shown in FIG. 6. The interconnecting member 182 at one end includes a slot (not shown) elongated longitudinally of the member 182 with a pin passing therethrough to provide the pivotal connection with the track 172, so that the longitudinal spacing between the pusher arms is allowed to be adjusted as the interconnecting member 182 remains connected therebetween.

Turning now to the gripper arms 200, each gripper arm 200 comprises a gripper hand 201 supported in fixed relation at a top of a support member 203 depending downwardly from the hand 201. A pair of pins, one 205 located at a bottom of the support member 203 and another one 206 located generally centrally of the support member 203 between its top and bottom, extend transversely to the support member with the bottom pin 205 being mated with a slot 208 in vertical plate 209 and the upper pin defining a central pivot point of the respective gripper arm that is not mated with the slot. The vertical plate is supported in its upstanding condition from the bottom leg 346 of the C-shaped bracket 340.

The slot 208 which forms a track following a pre-selected path for guiding movement of the gripper hands in a controlled fashion is disposed on a side of the support member 203 distally to the elevator.

On an opposite side of the support member 203 from the vertical plate 209 the central pin 206 is pivotally connected to an intermediary arm 211 which is L-shaped. The intermediary arm 211 is attached to a carrier 213 arranged to travel vertically upwardly and downwardly along a post 214 spanning vertically between the second and third legs 343, 346 of the C-shaped bracket. The post 214 supports a chain drive system 600, similar to those indicated at 400 and 500, which drives the carrier 213 up and down along the post. The chain drive system 600 includes a drive sprocket 603 at a bottom of the respective post 214 that is connected to a common main shaft 605 extending longitudinally of the elevator and connecting all of the gripper arms 200 together to a drive motor 608 so that all of the gripper arms are driven in unison.

Due to limitations on adjustability of the spacing between the outermost ones of the gripper arms, there is provided one gripper arm 200C which is fixedly located between the pair of outermost gripper arms. In order to provide adjustability of the spacing, the common drive shaft 605 is formed in at least two sections and are joined together in a telescoping configuration. In the illustrated embodiment, the main shaft is formed in three sections 606A-606C, where that portion of the drive shaft 605 extending through the fixedly located gripper arm 200C forms a receptacle 606C slidably receiving in telescoping configuration separate shaft sections 606A, 606B directly connected to the outermost gripper arms respectively. The receptacle 606C is polygonal-shaped in cross section, with at least four sides. In the illustrated arrangement, the shaft section 606C forming the receptacle is square in cross-section and the remaining sections 606A and 606B are circular in cross section. Despite being formed in separate sections, the sections are coupled to one another in a manner allowing them to rotate about an axis defined by the drive shaft 605 in fixed relation to one another. For example, the outer sections 606A, 606B may cooperate with the central polygonal section 606C for rotating together by a spline arrangement inside the section 606C which extends longitudinally along the receptacle so as to allow relative longitudinal movement of one section with respect to the next but resisting relative rotation therebetween. Also, couplers 609 may be provided on ends of the receptacle section 606C to strengthen connection with the other sections 606A, 606B.

Returning to the slot track 208 of the gripper arms guiding upward and downward movement thereof, each slot follows an uninterrupted path lying in an upstanding plane of the vertical plate 209 that is oriented longitudinally of the elevator. The uninterrupted path has components traversing two dimensions of this upstanding plane, so that the movement of the gripper hands 201 from an upper receiving position at the second side 142B of the table to the unloading location U at the conveyor below is not strictly vertically linear. That is, the gripper hands have some horizontal displacement as they are moved between the upper receiving position and the unloading location.

This horizontal movement causes the respective gripper hand 201 to be tilted about the central pivot point at pin 206 of the arm in a longitudinal direction generally towards one end of the table 140 where there is provided next to the conveyor 10 an upstanding stopper surface 216. The stopper surface 216 which is supported on upstanding legs 217 is located at the unloading location U so that an end of the respective elongated member 1 carried from the table 140 to the conveyor may be brought into butting engagement with the stopper surface 216 so as to load each elongated member onto the conveyor 10 at a common reference point longitudinally of the conveyor. As such, this reference point is defined by the upstanding surface 216 which is oriented transversely of the table 140. The surface 216 also extends from the unloading location U at a start 11A of the conveyor 10 to a location downstream thereof (which may be a terminal end of conveyor where the cutter is located 4) such that the surface extends parallel to the conveyor. Thus, as each elongated members moves down the conveyor the surface 216 may act to maintain the members at the reference point, which typically corresponds to a requirement of the cutter 4 or other processing machine receiving the members downstream of the loader 100.

Additionally, the end stopper surface 216 extends upwardly in a direction from the unloading location U generally towards the second side 142B of the table. As such, the members 1 may be brought into butting engagement with the stopper surface 216 prior to being unloaded onto the conveyor 1.

In order to effect the horizontal movement of gripper hands, the slot 208 has a first top portion 219 extending vertically downwardly from a closed top of the slot at a top of plate 209 to a first transition area 221A. At the first transition area begins a second intermediate portion 223 of the slot 208 where the slot extends both downwardly and horizontally so as to be inclined relative to the first top portion 219. The intermediate portion 223 ends at a second transition area 221B where a third bottom portion 225 is provided, extending vertically downwardly therefrom parallel to the first top portion 219 of the slot. The bottom portion 225 terminates at a closed bottom of the slot 208. It will be appreciated that the bottom portion 225 is longer than the top portion 219, and edges of the slot are curved at the first transition area 221A defining a junction of the first top portion 219 and the second intermediate portion 223. However, the edges of the slot form a vertex at each side of the slot at the second transition area 221B which defines a junction of the second intermediate portion 223 and the third bottom portion 225.

Thus, when there is a horizontal displacement between the pins 205 and 206 the hand 201 is tilted about the central pivot point 206, which travels vertically upwardly and downwardly without any horizontal movement in the illustrated arrangement, so as to locate the hand in a position opposite the bottom pin 205 such that the central pin 206 is intermediate the two. That is, movement of the bottom of the support member 203, where the bottom pin 205 is located, in one horizontal direction so that a horizontal displacement is formed relative to the central pin 206 causes the hand to be displaced in the opposite horizontal direction by tilting about the central pivot point. (The support member 203 may or may not be free to rotate about the central pin 206 depending on, for example, whether the pin 206 is fixed to the member 203 or to the intermediary arm 211 such that the pin would not be rotatable relative thereto.) Therefore, the path of the slot is shaped to guide the pin 205 in a manner effecting movement of the gripper hand about the pivot point 205 towards the stopper surface 216.

In the illustrated arrangement there is also provided a similar type of stopper surface 227 at the elevator 110 at a common end thereof so as to be alongside the end stopper surface 216. This additional stopper surface 227 is aligned with the stopper surface 216 longitudinally of the elevator such that the stopper surface 227 at the elevator provides an initial reference point longitudinally thereof to ensure that ends of the members 1 are not located longitudinally beyond the stopper surface 216 at the unloading location U before being moved across the table 140 for receipt on the gripper arms 200. As the pusher arms 170 move perpendicularly transverse to the elevator and table in the illustrated arrangement of the loader 100, a similar type of upstanding stopper surface may be omitted at the common end of the table 140 which would otherwise act to engage the ends of the members 1 as they are moved across the table 140 so as to prevent these member ends from being located longitudinally beyond the stopper surface 216.

Returning to the gripper arms 200, each gripper hand 201 forms an inclined support surface 229 on which the respective member 1 is supported, with a stop 230 at a lower end 231A of the respective gripper hand that is raised upwardly from the support surface 229. The respective hand 201 thus comprises a tubular body 232 which is supported in inclined orientation at its lower end by the support member 203. The hand 201 includes a flange 235 at an upper end which projects upwardly beyond an upper surface of the tubular body that defines the support surface 229. There is also provided a smaller flange 236 at the lower end of the tubular body that is raised above the top surface 229, that is above that portion of the surface 229 which is at the lower end of the hand. This smaller flange 236 defines the stop 230.

In the illustrated arrangement, the flange 235 is removably coupled at the upper end of the tubular body 232 by a conventional removable quick pin 235A. The pin 235A passes through an aperture in the flange 235 and into a receptacle with cooperating conventional coupling arrangement (not shown) within the tubular body of the respective hand 201 for holding the pin in fixed relation thereto. Thus the flange 235 is selectively removable allowing the gripper arms 200 to be arranged in a manner which may be suited for handling elongated members with cross-sections sized so as to exceed the length of the inclined support surface 229 as it is measured from the lower end 231A to the upper end where the flange 235 is locatable. As such, when the flange 235 is removed larger elongated members may be rested with one face thereof substantially flat against the surface 229 of the respective hand.

The inclined support surface 229 and the stop 230 are cooperative to maintain the respective member 1 on the hands 201 regardless of cross-sectional shape of the elongated member 1. For example, members having rounded cross-sections, whether wholly rounded like a circle or ellipse or partially rounded, have a tendency to roll about the rounded portion of their outer surface, so the inclined support surface 229 and cooperative stop 230 may maintain such members on the gripper arms in a controllable manner. Thus, by the incline of the body 232 of the hand, gravity conduces the member 1 towards the lower end 231A where the flange 236 acts to stop the member 1 from entirely falling off, thereby maintaining the member 1 on the hand.

The support surface 229 of the respective one of the gripper hands is inclined upwardly and transversely outwardly in the same transverse direction as the table 140.

The conveyor 10 comprises a plurality of member supports 12 movable in a direction transversely of the loader 100. Each member support 12 is generally shaped like a 'V' thereby forming a cradle transversely of the elongated member that is arranged to carry one of the elongated members 1 therein. The respective support 12 comprises a plurality of the V-shaped supports 13 which are arranged in a row longitudinally of the table 140 and carried in movement along an individual drive track 15 so as to collectively form a single support 12 for one of the members 1.

The respective member support 12 is shaped so as to carry each member in a stably seated manner therein. That is, each support has a first side 16 extending in linear fashion both upwardly and transversely in a direction away from the table 140 from an apex 17 of the member support 12 to a free terminus 20 of the first side, and a second side 19 extending in linear fashion both upwardly and transversely in a direction towards the table 140 from the apex 17 to a free terminus 22 of the second side. The first side 16 and second side 19 are arranged to form a right angle so that at the apex 17 of the member support 12 the respective elongated member 1 may be received matingly in the support with each one of two faces of the elongated member resting against one of the sides 16, 19 and an edge bordering the two faces seated matingly at the apex 17.

We now turn to use of the loader 100 and same in combination with the conveyor 10.

Initially, prior to being processed by any machinery or equipment such as the loader 100, the elongated members 1 are typically provided in a bundled set as such a set is easier to ship or transport in comparison to moving around such members arranged loosely in bulk. More specifically, the set of the members 1 is typically arranged in a stack comprising one or more horizontal layers with each layer having a plurality of the members, as shown in the illustrated arrangement.

Figure 6:
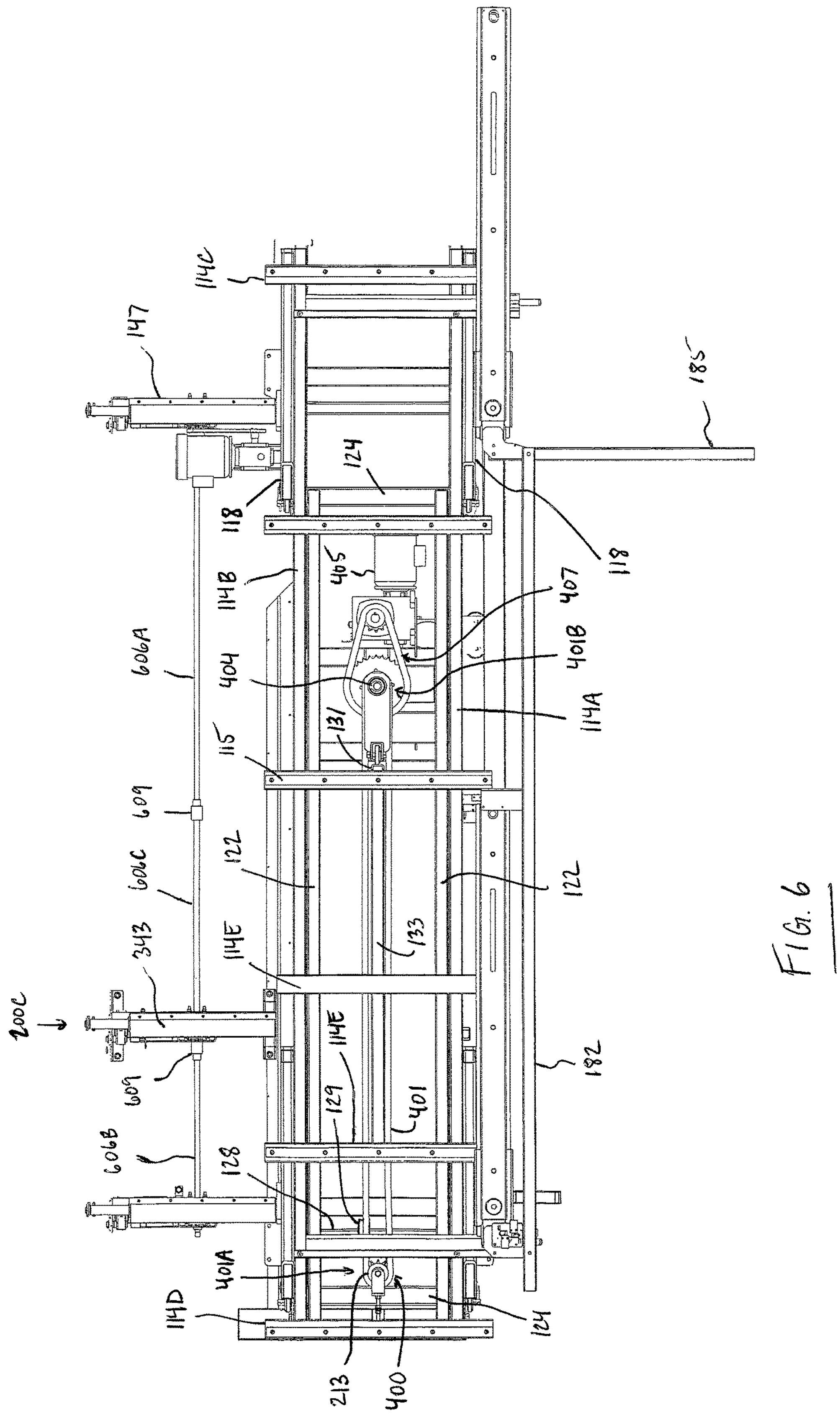
FIG. 6 is a top plan view of the system on its own but with pusher arms in a member loading position longitudinally of the system.
Figure 7:
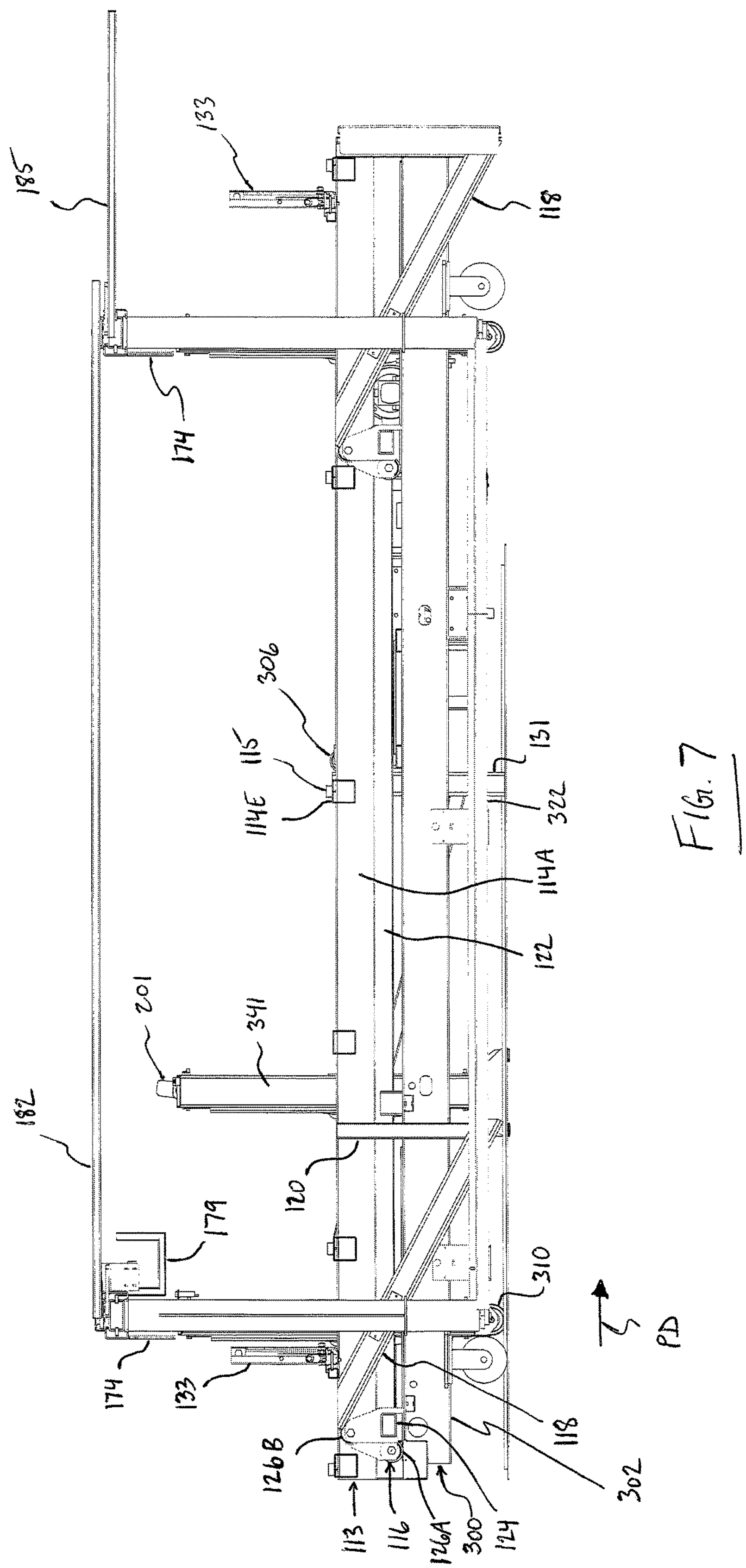
FIG. 7 is an elevational view of the system on its own.
Figure 8:
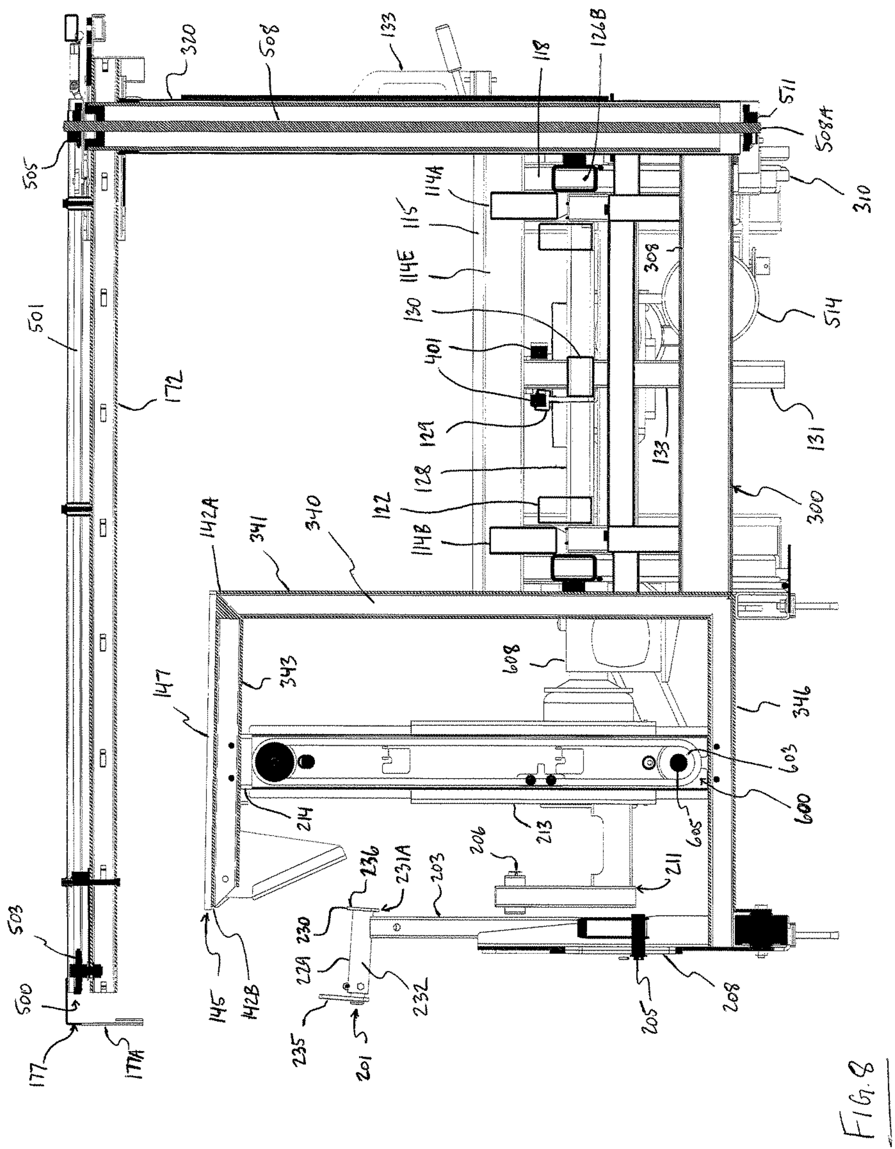
FIG. 8 is a cross-sectional view along line 8-8 in FIG. 5.

With the pusher arms 170 arranged in the member loading position as shown for example in FIG. 6, the set of elongated members is placed on the platform 113, using for example an overhead crane, such that the elongated members 1 are oriented longitudinally of the platform. More specifically, the set is arranged on the platform 113 with one side thereof against the first legs 341 of C-shaped brackets 340 and with ends of the members 1 against the elevator end stopper surface 227. Additionally, the adjustable side stop 133 is arranged in position opposite the first legs 341 of the C-shaped brackets 340 against the opposite side of the set so as to sandwich the bundled set of members between the legs 341 and the side stop 133. Straps holding the set together may then be removed as the members are contained in a space on the platform 113 that is delimited about a periphery of the platform by the first legs 341, adjustable side stop 133, and the end stopper surface 227.

A topmost layer 2 of the stacked set is arranged at the predetermined height where the first side 142A of the table is located by raising the platform 113 of the elevator. Although the topmost layer of members is thus presented at a height where they may be transferred onto the table 140, the members may be resisted from moving by their own inertia onto the table 140 as the table is inclined, that is its second side 142B distal to the elevator 110 is raised relative to the first side 142A of the table.

The topmost layer of members is then moved out of the stack and across the table 140 towards the second side 142B thereof where the gripper arms 200 are arranged so as to be at the height of the second side 142B. This is achieved by operating the pusher arms 170 arranged in the working position to push the members forming the topmost layer 2 out of the stack and across the inclined table surface 145, and continue pushing until the member which is farthest from the first side 142A of the table (and thus closest to the second side 142B thereof) passes over the second side 142B to the gripper arms 200 adjacent thereto. More particularly, the pusher arms 170 are operated to engage a first one of the members forming the topmost layer which is farthest from the first side 142A of the table so as to effect butting engagement of each member 1 and the next. In this manner movement of the elongated members across the table 140 in a direction from the first side 142A to the second side 142B is conduced. Thus, the pusher arms 170 act on the elongated members 1 transversely thereof to move them in the transverse direction. One member 1 at a time is loaded onto the gripper arms waiting in the upper receiving position at the height of the table's second side 142B.

Figure 2:
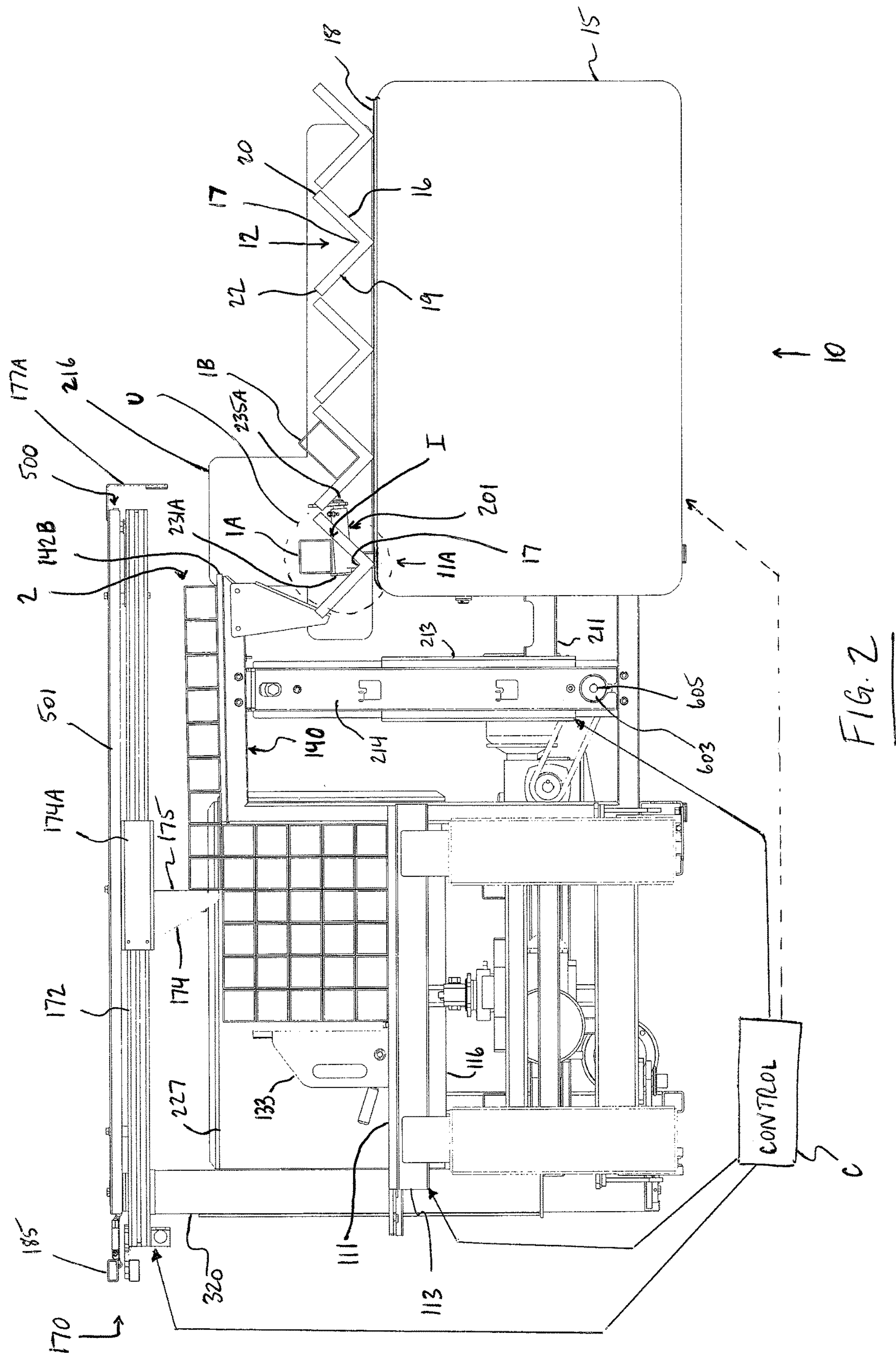
FIG. 2 is an elevational view from one end of the system and conveyor of FIG. 1.
Figure 3:
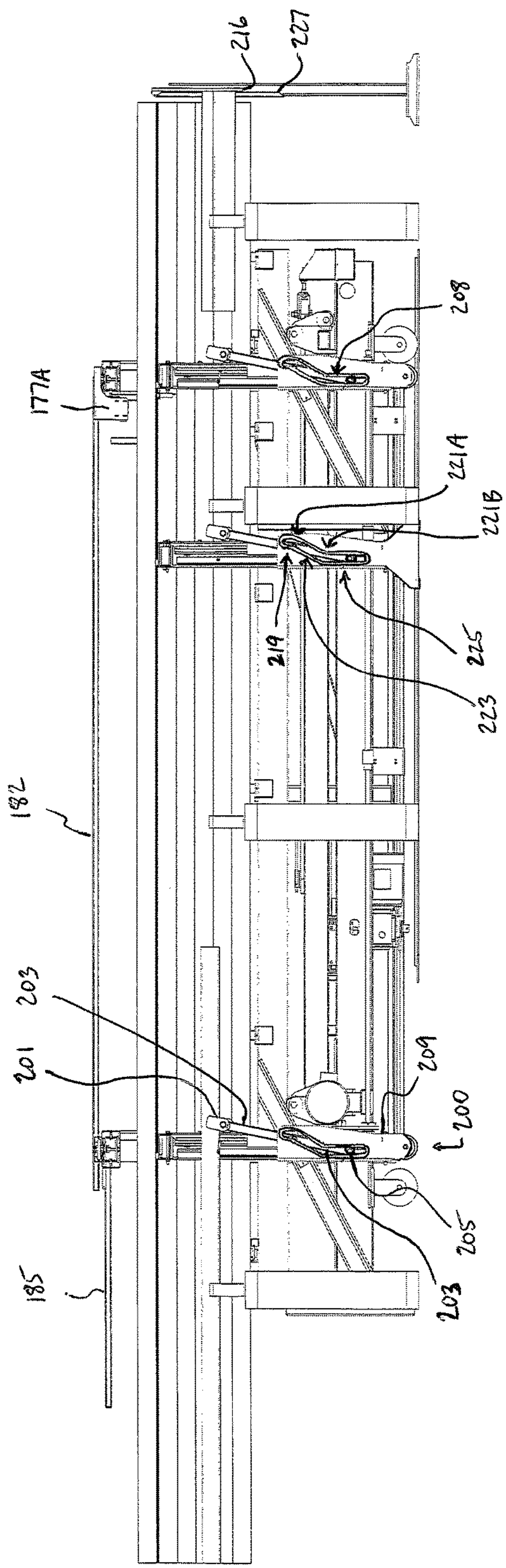
FIG. 3 is an elevational view from side end of the system and conveyor of FIG. 1 with that member in the support of the conveyor now omitted for clarity of illustration.

It will be appreciated that in FIG. 2 the topmost layer is shown as having a larger number of members than lower layers of the stack, but this is strictly for illustrative purposes.

With one of the elongated members 1 received in the gripper arms, that member 1 is lowered to the unloading location U so as to be unloaded from the gripper hands 201 to the member support 12 of the conveyor. As the member 1 is being lowered into the member support 12, the gripper arms 200 provide movement longitudinally of the elongated members so as to bring the one end of the respective member into butting engagement with the upstanding stopper surface 216, thereby placing that member at the common reference point suited for the cutter 4.

During transfer of the respective member from the gripper hands 201 to the cradle support 12 of the conveyor, the respective elongated member 1 is located upon initial contact with the support 13 transversely outwardly of the apex 17, as illustrated more clearly by FIG. 2 at I. This initial contact causes the respective elongated member 1 to rotate about its longitudinal axis in a rotational direction that would otherwise urge the member (by rolling movement) over the lower end 231A of the hand and towards the apex 17. The elongated member 1 continues to rotate about its axis in this fashion as the gripper arms are moved downwardly, until the elongated member is seated in the apex 17 of the V-shaped support.

The gripper hands 201 are arranged at the unloading location U with their lower ends 231A spaced transversely of the apex 17 in a direction to the other side of the apex from where the elongated member makes its initial contact with the cradle member support 12, which in the illustrated arrangement is made at the first side 16 of the member support. It will be appreciated that the member 1 received in the gripper hands 201 is typically resting against the stop 230 due to the incline of the support surface 229 as the hands move downwardly from the table 140 towards the unloading location U. As such, the stop 230 in cooperation with the inclined support surface 229 act to retain on the gripper arms the elongated member 1 in a controllable manner thereon with minimal movement transversely of the hands, which is particularly suited for members which have a cross-section shaped so as to be susceptible to rolling movement. Furthermore, the stop 230 can act to retain the member 1 on the arms 200 after its first contact with the conveyor member support 12 even as the member is rotating about its axis in the rotational direction that would otherwise cause the member to roll off over the lower end 231A. Moreover, it will be appreciated that the support surface 229 of the hands 201 is inclined at a smaller angle to the horizontal than either side 16 or 19 of the conveyor member support 12 relative thereto, such that a rate of rotation of the elongated member 1 that occurs from the initial contact as the gripper arms is sufficiently controllable to maintain the member 1 on the arms 200 until the hands are arranged at or below the apex 17.

Once one of the member supports 12 of the conveyor has received one elongated member, that support 12 is advanced downstream along the conveyor 10 in a direction transverse of the elongated members. As such, another empty support is locatable at the start 11A of the conveyor at the unloading location U for receiving another one of the members 1. The member supports 12 are supported along the conveyor on a closed loop 18 thereof (shown partially and represented schematically) so that empty supports are returnable to the unloading location which is at an upstream terminus of the conveyor.

It will be appreciated that in some instances the gripper arms 200 may be operated to lift and bring back up one of the elongated members that were lowered into the respective cradle support 12. As such, in the illustrated arrangement there is provided a guide 240 with an inclined surface 241 which extends from a top end located generally in line with the second side 142B of the table transversely thereof, to a bottom end which is arranged spaced therefrom in the opposite transverse direction towards the elevator 110. This guide 240 may act to prevent the respective member from being caught in upward movement by an underside of the table 140 at the table's second side 142B. Furthermore, this guide 240 may be cooperative with an inclined side of the table 140 at its second side 142A.

It also will be appreciated that the cooperative components of the loader 100 may be operated by a human operator who uses a controller C (schematically shown) to for example operate each one of the elevator 110, the pusher arms 170, and the gripper arms 200, as well as the conveyor 10 in a cooperative manner as described hereinbefore.

Alternatively, the loader 100 may include a control system at C in lieu of the controller described in the previous paragraph, where the control system facilitates autonomous operation of the loader. The control system for example includes a plurality of sensors tracking movement of the members on and from the elevator 110, across the table 140, and in movement on the gripper arms 200.

In one such arrangement having the control system, one or more sensors may be arranged to detect a condition of the topmost layer of the members being arranged at the height of the first side 142A of the table. Once this condition is satisfied, the control system instructs the pusher arms to push the members forming the topmost layer across the table at a predetermined speed or rate. Another set of one or more sensors arranged at the second side 142B of the table may detect movement of the respective member over the edge of the table at this second side and thus onto the gripper hands 201 arranged thereat. Additionally, yet another set of one or more sensors arranged at the unloading location determine when the respective elongated member 1 is properly seated in the apex of the member support 12 so that that support 12 can be advanced. Should the member 1 not be properly seated, the gripper hands 201 may be brought up to lift the member out of the cradle support 12 for another attempt at placing the member properly therein.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A system for loading members which are elongated in a longitudinal direction onto a conveyor which feeds the elongated members to another machine for processing said elongated members, the system comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

at least one pusher arm arranged at the predetermined height and carried for movement transversely of the elevator for transferring the elongated members in a transverse direction off of the elevator;

said at least one pusher arm each having a pushing surface facing in the transverse direction for contacting a trailing side of the respective elongated member located at the predetermined height such that said at least one pusher arm displaces the elongated members in a pushing movement of said at least one pusher arm in which the elongated members lead said at least one pusher arm;

a second support surface for receiving the elongated members transferred from the elevator that is provided at the predetermined height with a first side adjacent the elevator and an opposite second side spaced transversely outwardly thereof;

said at least one pusher arm being movable across the second support surface in the transverse direction so as to move the elongated members towards the second side of the second support surface;

one or more lowering members at or adjacent the second side of the second support surface which are movable in upward and downward directions from the second support surface to an unloading location below said second side of the second support surface, where the elongated members are arranged for unloading from the lowering members and loading onto the conveyor;

the second support surface being inclined downwardly from the second side towards the first side such that the elongated members can be controllably transferred from the second support surface over the second side thereof to the lowering members absent any other surface opposite to the at least one pusher arm leading the elongated members in the direction of the pushing movement.

2. The system according to claim 1 wherein there is provided an upstanding surface at one end of the second support surface at the unloading location and the lowering members are also movable toward the upstanding surface so as to bring an end of the respective elongated member carried thereby into butting engagement with the upstanding surface so as to load each elongated member onto the conveyor at a common reference point longitudinally of the conveyor.

3. The system according to claim 1 wherein each lowering member forms a support surface inclined upwardly and outwardly in a transverse direction with a stop at a lower end of the support surface that is raised upwardly from said support surface for resisting the respective elongated member carried by the lowering members from rolling off the lower ends of the lowering members.

4. The system according to claim 3 wherein said support surface extends outwardly in the same transverse direction as the second support surface.

5. The system according to claim 1 wherein the elevator comprises a platform defining the first support surface that is movable in the upward direction, inclined transmission members at longitudinally spaced positions of the platform that extend downwardly therefrom and horizontally in a predetermined direction, and a pushing assembly disposed under the first support surface that is arranged for movement in a horizontal plane in the predetermined direction for pushing against the transmission members so as to effect movement of the platform upwardly.

6. The system according to claim 1 wherein the respective lowering member is guided in upward and downward movement by a support member extending downwardly from a gripper hand of the lowering member for holding the respective elongated member with a central pivot point and a pin therebelow extending transversely of the support member that is mated in a substantially vertically extending track which follows an uninterrupted path having components in two dimensions in an upstanding plane oriented longitudinally of the elevator.

7. The system according to claim 6 wherein the central pivot point is in fixed relation longitudinally of the elevator so as to move vertically upwardly and downwardly as the pin traverses the uninterrupted path of the track such that a horizontal displacement of the pin with respect to the central pivot point causes the respective lowering member to pivot thereabout thereby locating the hand in a position by which the pivot point is horizontally intermediate the gripper hand and the pin.

8. The system according to claim 1 wherein said at least one pusher arm comprises a pair of the pusher arms at spaced locations longitudinally of the elevator and wherein longitudinal spacing between each one of the pair of pusher arms is adjustable such that elongated members of different lengths are movable thereby.

9. The system according to claim 1 wherein said one or more lowering members comprises a plurality of the lowering members and wherein longitudinal spacing between each one of a pair of the lowering members is adjustable such that elongated members of different lengths are movable thereby.

10. The system according to claim 9 wherein one of the plurality of the lowering members is fixedly located between said pair of the lowering members and wherein a drive assembly arranged for driving the lowering members in upward and downward movement includes a longitudinally extending shaft formed in at least two sections where one of the sections forms a receptacle for slidably receiving another one of the sections so as to adjust the longitudinal spacing of the pair of the lowering members relative to the lowering member that is fixedly located.

11. The system according to claim 10 wherein said one of the sections forming the receptacle is polygonal-shaped in transverse cross-section with at least four sides.

12. The system according to claim 1 wherein said at least one pusher arm each include the pushing surface carried along an elongate track which is pivotally supported alongside the elevator distally to the second support surface such that the respective track is arranged for swivelling movement about an upstanding axis so as to be movable from a working position in which the track is oriented transversely of the elevator to a member loading position in which the track is oriented longitudinally of the elevator alongside thereto.

13. The system according to claim 1 in combination with the conveyor wherein the conveyor comprises a plurality of movable supports each arranged to carry one of the elongated members therein, each one of the movable supports of the conveyor for carrying the elongated members being generally V-shaped and oriented transversely of the second support surface, and the unloading location of the lowering members is arranged to locate the respective elongated member upon initial contact with the respective V-shaped support transversely outwardly of its apex.

14. A method for loading elongated members which are elongated in a longitudinal direction onto a conveyor which feeds the elongated members to another machine for processing said elongated members, the method comprising:

providing a system for loading the elongated members onto the conveyor comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

a second support surface provided at the predetermined height with a first side adjacent the elevator and an opposite second side spaced transversely outwardly thereof;

one or more lowering members at or adjacent the second side of the second support surface in opposite relation to the elevator;

said one or more lowering members being movable in upward and downward directions from the second support surface to an unloading location below said second side of the second support surface where the elongated members are arranged for unloading from the lowering members and loading onto the conveyor;

at least one pusher arm arranged at the predetermined height and carried for movement transversely of the elevator for moving the elongated members in the transverse direction from the elevator and across the second support surface so as to move the elongated members from the elevator across the second support surface over the second side thereof to the lowering members adjacent thereto;

providing the set of the elongated members arranged in one or more layers in a stack on the first support surface on the elevator;

arranging a topmost layer of the stack at the predetermined height by raising the first support surface of the elevator;

pushing each one of the elongated members forming the topmost layer by engaging, with said at least one pusher arm, a first one of the elongated members forming the topmost layer which is farthest from the first side of the second support surface so as to effect butting engagement of each elongated member and the next in a manner conducing movement of the elongated members across the second support surface in a direction from the first side to the second side, such that the topmost layer of the stack of the elongated members is moved out of the stack and across the second support surface towards the lowering members arranged at a height of the second side of the second support surface;

and with the respective elongated member received on the lowering members, lowering the respective elongated member to the unloading location.

15. The method according to claim 14 wherein there is provided an upstanding surface at one end of the second support surface at the unloading location, and at a point during the step of lowering the respective elongated member to the unloading location an end of said elongated member is brought into butting engagement with the upstanding surface so as to load each elongated member onto the conveyor at a common reference point longitudinally of the conveyor.

16. The method according to claim 14 wherein there is provided the conveyor comprising a plurality of movable supports which are generally V-shaped and oriented transversely of the second support surface, and the respective elongated member arranged at the unloading location is located upon initial contact with the respective V-shaped support transversely outwardly of its apex causing the respective elongated member to rotate about its longitudinal axis as the lowering members are moved downwardly until the elongated member is seated in the apex of the V-shaped support.

17. The method according to claim 14 wherein the second support surface is inclined so that the second side thereof is raised relative to the first side such that the elongated members of the topmost layer are pushed across an incline towards the lowering members arranged at the height of the second side of the second support surface.

18. A method for loading elongated members which are elongated in a longitudinal direction onto a conveyor which feeds the elongated members to another machine for processing said elongated members, the method comprising:

providing a system for loading the elongated members onto the conveyor comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

a second support surface provided at the predetermined height with a first side adjacent the elevator and an opposite second side spaced transversely outwardly thereof;

one or more lowering members at or adjacent the second side of the second support surface in opposite relation to the elevator;

said one or more lowering members being movable in upward and downward directions from the second support surface to an unloading location below said second side of the second support surface where the elongated members are arranged for unloading from the lowering members and loading onto the conveyor;

at least one pusher arm arranged at the predetermined height and carried for movement transversely of the elevator for moving the elongated members in the transverse direction from the elevator and across the second support surface so as to move the elongated members from the elevator across the second support surface over the second side thereof to the lowering members adjacent thereto;

providing the set of the elongated members arranged in one or more layers in a stack on the first support surface on the elevator;

providing the conveyor comprising a plurality of movable supports which are generally V-shaped and oriented transversely of the second support surface so that the elongated members oriented longitudinally of the second support surface can be received in the movable supports of the conveyor;

arranging a topmost layer of the stack at the predetermined height by raising the first support surface of the elevator;

with said at least one pusher arm, moving the topmost layer of the stack of the elongated members out of the stack across the second support surface towards the lowering members arranged at a height of the second side of the second support surface;

and with the respective elongated member received on the lowering members, lowering the respective elongated member to the unloading location;

wherein the respective elongated member arranged at the unloading location is located upon initial contact with the respective V-shaped movable support transversely outwardly of its apex causing the respective elongated member to rotate about its longitudinal axis as the lowering members are moved downwardly until the elongated member is seated in the apex of the V-shaped support.

19. A system for loading members which are elongated in a longitudinal direction onto a conveyor which feeds the elongated members to another machine for processing said elongated members, the system comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

at least one pusher arm arranged at the predetermined height and carried for movement transversely of the elevator for transferring the elongated members in a transverse direction off of the elevator;

said at least one pusher arm each having a pushing surface facing in the transverse direction for contacting a trailing side of the respective elongated member located at the predetermined height such that said at least one pusher arm displaces the elongated members in a pushing movement of said at least one pusher arm in which the elongated members lead said at least one pusher arm;

a second support surface for receiving the elongated members transferred from the elevator that is provided at the predetermined height with a first side adjacent the elevator and an opposite second side spaced transversely outwardly thereof;

one or more lowering members at or adjacent the second side of the second support surface which are movable in upward and downward directions from the second support surface to an unloading location below said second side of the second support surface, where the elongated members are arranged for unloading from the lowering members and loading onto the conveyor;

said at least one pusher arm being movable across the second support surface in the transverse direction so as to move the elongated members towards and over the second side of the second support surface to the lowering members;

wherein each lowering member forms a support surface inclined upwardly and transversely outwardly with a stop at a lower end of the support surface that is raised upwardly from said support surface for resisting the respective elongated member carried by the lowering members from rolling off the lower ends of the lowering members.

20. A system for loading members which are elongated in a longitudinal direction onto a conveyor which feeds the elongated members to another machine for processing said elongated members, the system comprising:

an elevator defining a first support surface extending longitudinally in the longitudinal direction for carrying a set of the elongated members each oriented longitudinally of the elevator;

the elevator being movable in an upward direction to lift each elongated member carried thereon to a predetermined height;

at least one pusher arm arranged at the predetermined height and carried for movement transversely of the elevator for transferring the elongated members in a transverse direction off of the elevator;

said at least one pusher arm each having a pushing surface facing in the transverse direction for contacting a trailing side of the respective elongated member located at the predetermined height such that said at least one pusher arm displaces the elongated members in a pushing movement of said at least one pusher arm in which the elongated members lead said at least one pusher arm;

a second support surface for receiving the elongated members transferred from the elevator that is provided at the predetermined height with a first side adjacent the elevator and an opposite second side spaced transversely outwardly thereof;

one or more lowering members at or adjacent the second side of the second support surface which are movable in upward and downward directions from the second support surface to an unloading location below said second side of the second support surface, where the elongated members are arranged for unloading from the lowering members and loading onto the conveyor;

said at least one pusher arm being movable across the second support surface in the transverse direction so as to move the elongated members towards and over the second side of the second support surface to the lowering members;

wherein the elevator comprises a platform defining the first support surface that is movable in the upward direction, inclined transmission members at longitudinally spaced positions of the platform that extend downwardly therefrom and horizontally in a predetermined direction, and a pushing assembly disposed under the first support surface that is arranged for movement in a horizontal plane in the predetermined direction for pushing against the transmission members so as to effect movement of the platform upwardly.

* * * * *